(12) United States Patent
Ikehara et al.

(10) Patent No.: US 12,360,089 B2
(45) Date of Patent: Jul. 15, 2025

(54) GAS SPECTROSCOPIC DEVICE AND GAS SPECTROSCOPIC METHOD

(71) Applicants: Shimadzu Corporation, Kyoto (JP); National University Corporation Tokai National Higher Education and Research System, Nagoya (JP)

(72) Inventors: Tatsuya Ikehara, Kyoto-shi (JP); Kazune Mano, Kyoto (JP); Hideki Tomita, Nagoya-shi (JP); Ryohei Terabayashi, Nagoya (JP); Kenji Yoshida, Tokyo (JP); Shin-ichi Ninomiya, Tokyo (JP)

(73) Assignees: SHIMADZU CORPORATION, Kyoto (JP); National University Corporation Tokai National Higher Education and Research System, Nagoya (JP)

( * ) Notice: Subject to any disclaimer, the term of this patent is extended or adjusted under 35 U.S.C. 154(b) by 168 days.

(21) Appl. No.: 18/011,648

(22) PCT Filed: Jun. 25, 2020

(86) PCT No.: PCT/JP2020/025053
§ 371 (c)(1),
(2) Date: Dec. 20, 2022

(87) PCT Pub. No.: WO2021/260892
PCT Pub. Date: Dec. 30, 2021

(65) Prior Publication Data
US 2023/0258615 A1 Aug. 17, 2023

(51) Int. Cl.
*G01N 30/60* (2006.01)
*G01N 30/74* (2006.01)
*G01N 30/88* (2006.01)

(52) U.S. Cl.
CPC ............. *G01N 30/60* (2013.01); *G01N 30/74* (2013.01); *G01N 30/88* (2013.01)

(58) Field of Classification Search
CPC ........ G01N 30/60; G01N 30/74; G01N 30/88; G01N 21/39; G01N 30/32
(Continued)

(56) References Cited

U.S. PATENT DOCUMENTS

2019/0094195 A1   3/2019   Gentner

FOREIGN PATENT DOCUMENTS

JP          6473367 B2 *  2/2019  ............. F27D 21/02
JP       2019-516962 A    6/2019

OTHER PUBLICATIONS

Tomita et al.,"Development of radioactive carbon isotope analysis system based on cavity ring-down laser spectroscopy", Japan Atomic Energy Association, 2016.
(Continued)

*Primary Examiner* — Md M Rahman
(74) *Attorney, Agent, or Firm* — Muir Patent Law, PLLC

(57) ABSTRACT

A column 2 is provided in a gas capturing unit 20 for capturing sample gas. A gas supply unit 1 supplies carrier gas for sending sample gas into the column 2. A gas separation mechanism 100 guides carrier gas in the column 2 to the outside of the column 2 by setting the lead-out path 5 to negative pressure with respect to the inside of the column 2. A heating unit 23 heats the column 2 to desorb sample gas captured by the gas capturing unit 20. Sample gas desorbed from the gas capturing unit 20 is introduced into a cell 31. A light source unit 32 irradiates sample gas in the cell 31 with light. An analysis unit 3 analyzes sample gas based on an intensity change of light emitted by the light source unit 32.

19 Claims, 11 Drawing Sheets

(58) Field of Classification Search
USPC .......................................................... 356/437
See application file for complete search history.

(56) References Cited

OTHER PUBLICATIONS

Van Duijn et al., "Automated Combustion Accelerator Mass Spectrometry for the Analysis of Biomedical Samples in the Low Attomole Range" dx.doi.org/10.1021/ac5015035, Analytical Chemistry (2014).
Written Opinion of The International Searching Authority dated Sep. 24, 2020, for PCT application No. PCT/JP2020/025053.

* cited by examiner

GAS SPECTROSCOPIC DEVICE AND GAS SPECTROSCOPIC METHOD

TECHNICAL FIELD

The present invention relates to a gas spectroscopic device and a gas spectroscopic method.

BACKGROUND ART

Among gas spectroscopic devices that irradiate sample gas in a cell with light, there is a thermal desorption type gas spectroscopic device that introduces sample gas into a cell from a column by heating the column. In this type of gas spectroscopic device, an adsorbent is provided in a column, and sample gas supplied into the column together with carrier gas is concentrated by being adsorbed to the adsorbent. The sample gas adsorbed to the adsorbent is desorbed from the adsorbent as the column is heated, and introduced into a cell.

As described above, in the thermal desorption type gas spectroscopic device, not only sample gas but also carrier gas flows into a column. For this reason, there is a limit to the concentration of sample gas in a column, and as a result of carrier gas mixing into sample gas introduced from the column into a cell, it has been difficult to increase the concentration of the sample gas in the cell to the utmost limit.

Patent Document 1 below discloses a mass spectrometry method in which an accelerator mass spectrometry (AMS) and an elemental analyzer (EA) are combined. In the mass spectrometry method disclosed in Patent Document 1, $CO_2$ as sample gas is adsorbed to a trap, and the trap is heated so that $CO_2$ is desorbed and guided to a syringe.

PRIOR ART DOCUMENT

Non-Patent Document

Non-Patent Document 1: Esther van Duijn et. al., "Automated combustion accelerator mass spectrometry for the analysis of biomedical samples in the low attomole range." Anal Chem. 5; 86(15):7635-41 2014

SUMMARY OF THE INVENTION

Problems to be Solved by the Invention

In a configuration in which mass spectrometry is performed using AMS as in Non-Patent Document 1, it is possible to perform analysis with high accuracy without increasing the concentration of sample gas to the utmost limit. For this reason, even if carrier gas flowing together with sample gas into a trap is directly introduced from the trap to AMS together with the sample gas, a problem such as decrease in analysis accuracy due to mixture of the carrier gas hardly occurs.

On the other hand, in a thermal desorption type gas spectroscopic device, it is more preferable as the concentration of sample gas in a cell is higher. For example, in a gas absorption spectroscopic device that is an example of a gas spectroscopic device, analysis accuracy increases as the concentration of sample gas in a cell is closer to 100%.

The present invention has been made in view of the above circumstances, and an object of the present invention is to provide a gas spectroscopic device and a gas spectroscopic method capable of increasing the concentration of sample gas in a cell.

Means for Solving the Problems

A first aspect of the present invention is a spectroscopic device including a gas capturing unit, a gas supply unit, a gas separation mechanism, a heating unit, a cell, a light source unit, and an analysis unit. The gas capturing unit has a column, an upstream side flow path, and a downstream side flow path, and captures sample gas. The gas supply unit is connected to the upstream side flow path of the gas capturing unit, and supplies carrier gas for sending sample gas into the column. The gas separation mechanism guides carrier gas in the column to the outside of the column by setting the downstream side flow path of the gas capturing unit to negative pressure with respect to the inside of the column. The heating unit heats the column to desorb sample gas captured by the gas capturing unit. The cell receives sample gas desorbed from the gas capturing unit. The light source unit irradiates sample gas in the cell with light. The analysis unit analyzes the sample gas based on an intensity change of light emitted from the light source unit.

A second aspect of the present invention includes a gas supply step, a gas separation step, a heating step, a cell introduction step, a light irradiation step, and an analysis step. In the gas supply step, carrier gas for sending sample gas is supplied from a gas supply unit connected to an upstream side flow path provided in the gas capturing unit for capturing sample gas into a column provided in the gas capturing unit. In the gas separation step, carrier gas in the column is guided to the outside of the column by setting a downstream side flow path provided in the gas capturing unit to negative pressure with respect to the inside of the column. The heating step heats the column to desorb sample gas captured by the gas capturing unit. The cell introduction step introduces sample gas desorbed from the gas capturing unit into a cell. The light irradiation step irradiates sample gas in the cell with light from a light source unit. The analysis step analyzes the sample gas based on an intensity change of light emitted from the light source unit.

Effects of the Invention

According to the present invention, since carrier gas in the column is guided to the outside of the column by negative pressure, sample gas is captured in the gas capturing unit at a high concentration. Therefore, by desorbing sample gas from the gas capturing unit and introducing the sample gas into the cell, the concentration of the sample gas in the cell can be increased.

MODE FOR CARRYING OUT THE INVENTION

1. Overall Configuration of Gas Absorption Spectroscopic Device

Figure 1:
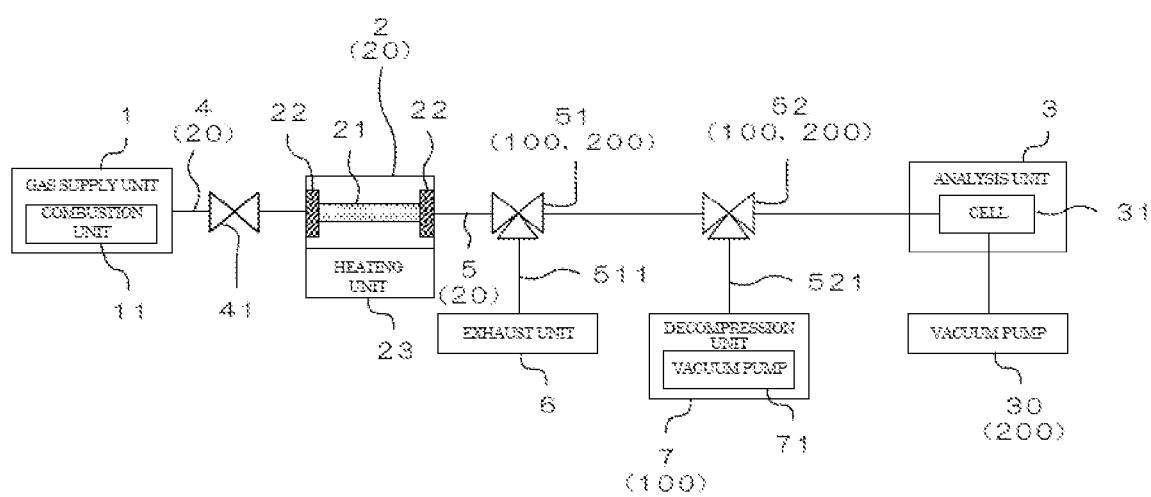
FIG. 1 is a flow path diagram illustrating an embodiment of a gas absorption spectroscopic device.

FIG. 1 is a flow path diagram illustrating an embodiment of a gas absorption spectroscopic device. This gas absorption spectroscopic device is an example of a gas spectroscopic device, and is a device for measuring the concentration of a target component in sample gas by using the fact that a part of light applied to the sample gas is absorbed by a component in the sample gas.

Sample gas is supplied from a gas supply unit 1 to an analysis unit 3 via a column 2. The sample gas is, for example, gas generated as a sample is burned in a combustion unit 11 provided in the gas supply unit 1, and contains at least $CO_2$. The sample gas containing $CO_2$ is introduced into a cell 31 provided in the analysis unit 3.

The combustion unit 11 of the gas supply unit 1 communicates with the column 2 via an introduction path 4. Sample gas generated in the combustion unit 11 is sent to the introduction path 4 together with carrier gas, and is introduced into the column 2. The carrier gas may be, for example, inert gas such as $N_2$ or He, or another type of gas such as $O_2$. A valve 41 for opening and closing the introduction path 4 is provided in the introduction path 4. The valve 41 is, for example, a two-way valve, and allows the passage of gas in the introduction path 4 in an open state and blocks the passage of gas in the introduction path 4 in a closed state.

An adsorbent 21 for adsorbing and capturing sample gas is provided inside the column 2. The column 2 is a hollow long member, and both end portions in the longitudinal direction are opened. Sealing portions 22 are provided in both end portions of the column 2. The adsorbent 21 is sealed in the column 2 by the sealing portion 22. The sealing portion 22 is capable of allowing gas to pass through, and is capable of allowing gas to pass through into the column 2 while preventing the adsorbent 21 from being discharged from each end portion of the column 2. The column 2 is externally heated by a heating unit 23 including a heater, for example. Sample gas adsorbed by the adsorbent 21 can be desorbed as the column 2 is heated by the heating unit 23.

The introduction path 4 communicates with one end portion of the column 2. The other end portion of the column 2 communicates with the cell 31 of the analysis unit 3 via a lead-out path 5. That is, the introduction path 4 constitutes an upstream side flow path provided upstream of the column 2, and the lead-out path 5 constitutes a downstream side flow path provided downstream of the column 2. The column 2, the introduction path 4, and the lead-out path 5 constitute a gas capturing unit 20 for capturing sample gas. The sample gas desorbed from the adsorbent 21 in the column 2 is sent out from the column 2 through the lead-out path 5 and introduced into the cell 31. In the lead-out path 5, a flow path switching unit (a first flow path switching unit 51 and a second flow path switching unit 52) for switching a flow path is provided.

The first flow path switching unit 51 and the second flow path switching unit 52 include, for example, a three-way valve. The second flow path switching unit 52 is provided on the downstream side (cell 31 side) of the first flow path switching unit 51 in the lead-out path 5. A first branch path 511 branching from the lead-out path 5 communicates with the first flow path switching unit 51. On the other hand, a second branch path 521 branching from the lead-out path 5 communicates with the second flow path switching unit 52.

One end portion of the first branch path 511 is fluidly connected to the first flow path switching unit 51, and the other end portion of the first branch path 511 communicates with an exhaust unit 6. The exhaust unit 6 is for exhausting gas in the column 2. The exhaust unit 6 includes a drain for exhausting gas from the inside of the column 2 to the outside of a device.

One end portion of the second branch path 521 is fluidly connected to the second flow path switching unit 52, and the other end portion of the second branch path 521 communicates with a decompression unit 7. The decompression unit 7 is for reducing pressure in the lead-out path 5 via the second branch path 521. The decompression unit 7 includes a vacuum pump 71 driven to exhaust gas in the lead-out path 5 so that the lead-out path 5 has negative pressure with respect to the column 2.

The first flow path switching unit 51 can switch a flow path to either a branched state in which the upstream side of the lead-out path 5 communicates with the first branch path 511 or a non-branched state in which the upstream side of the lead-out path 5 communicates with the downstream side. When the first flow path switching unit 51 is in the branched state, the exhaust unit 6 communicates with the inside of the column 2 via the first branch path 511. On the other hand, when the first flow path switching unit 51 is in the non-branched state, the column 2 does not communicate with the exhaust unit 6 but communicates with the second flow path switching unit 52.

The second flow path switching unit 52 can switch a flow path to either a branched state in which the upstream side of the lead-out path 5 communicates with the second branch path 521 or a non-branched state in which the upstream side of the lead-out path 5 communicates with the downstream side. When the second flow path switching unit 52 is in the branched state, the decompression unit 7 communicates with the first flow path switching unit 51 via the second branch path 521. On the other hand, when the second flow path switching unit 52 is in the non-branched state, the first flow path switching unit 51 does not communicate with the decompression unit 7 but communicates with the cell 31 of the analysis unit 3.

That is, in a case where the first flow path switching unit 51 is in the non-branched state and the second flow path switching unit 52 is in the branched state, the column 2 communicates with the decompression unit 7 via the first flow path switching unit 51 and the second flow path switching unit 52. On the other hand, in a case where the first flow path switching unit 51 is in the non-branched state and the second flow path switching unit 52 is also in the non-branched state, the column 2 communicates with the cell 31 via the first flow path switching unit 51 and the second flow path switching unit 52.

A vacuum pump 30 communicates with the cell 31 of the analysis unit 3. By driving the vacuum pump 30, gas in the cell 31 can be exhausted so that the cell 31 has negative pressure with respect to the column 2. The vacuum pump 30 and the vacuum pump 71 are not limited to a configuration of being provided separately as in the present embodiment, and for example, a vacuum pump communicating with the cell 31 can be shared to constitute the decompression unit 7.

2. Specific Configuration of Column

Figure 2A:
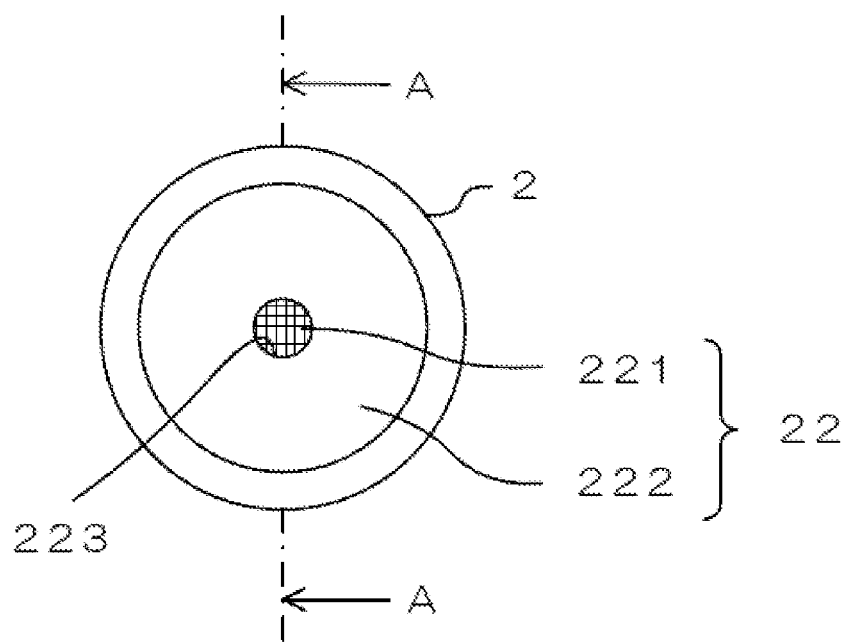
FIG. 2A is a schematic front view of a column.
Figure 2B:
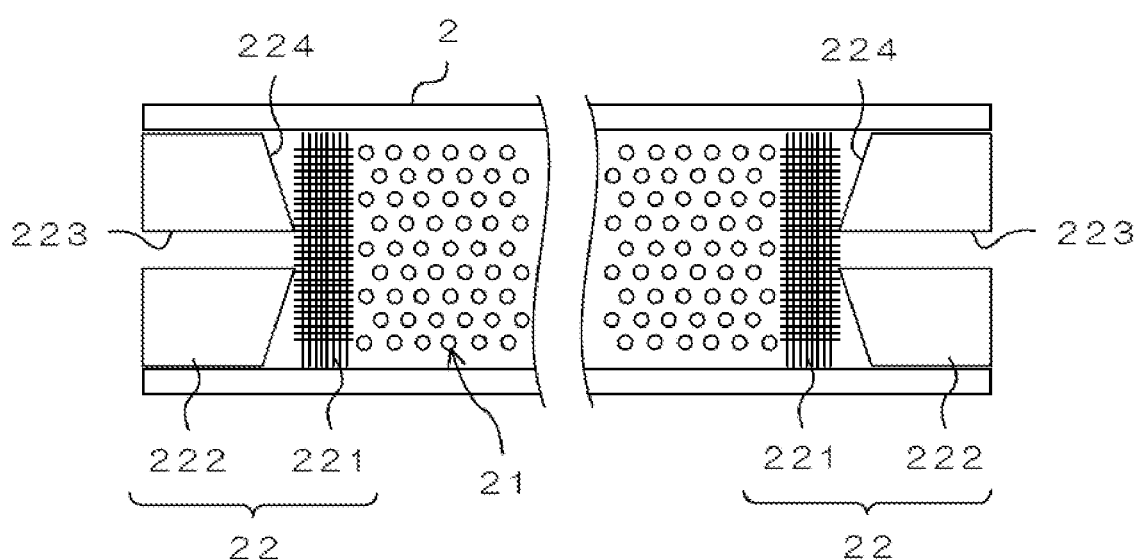
FIG. 2B is a cross-sectional view taken along line A-A of the column in FIG. 2A.

FIG. 2A is a schematic front view of the column 2. FIG. 2B is a cross-sectional view taken along line A-A of the column 2 in FIG. 2A. As illustrated in FIGS. 2A and 2B, the column 2 has, for example, a cylindrical shape extending in a straight line.

A material of the adsorbent 21 provided in the column 2 is not particularly limited, but for example, zeolite is used. The zeolite is granular, and the column 2 is filled with a plurality of pieces of zeolite in close contact with each other. A large number of pores are formed on the surface of the zeolite, and carbon dioxide molecules can be adsorbed to each pore. There are types of zeolite such as 3A type, 4A type, 5A type, and 13x type, and among them, 13x type may be used.

Each of the sealing portions 22 provided at both end portions of the column 2 includes a filter member 221 and a holding member 222. The filter member 221 is a ventilatable mesh-like member, and has a plurality of vent holes smaller than each particle of the adsorbent 21. A material of the filter member 221 is not particularly limited, but for example, quartz wool is used. Each of the filter members 221 is formed in a circular shape having an outer diameter corresponding to an inner diameter of the column 2 and covers each end portion of the column 2.

Each of the holding members 222 is fixed to the outer side of each of the filter members 221 (the side opposite to the adsorbent 21 side), and holds each of the filter members 221 in the column 2. That is, each of the filter members 221 is sandwiched between each of the holding members 222 and the adsorbent 21. Each of the holding members 222 is formed in a circular shape having an outer diameter corresponding to an inner diameter of the column 2, and a through hole 223 extending along a central axis of the column 2 is formed in a central portion. Inflow and outflow of gas into and from the column 2 are performed through a through hole 223 formed in each of the holding members 222.

A surface on the inner side (adsorbent 21 side) of each of the holding members 222 is a conical tapered surface 224 tapered toward a central portion. By the above, each of the filter members 221 is caught by a tip end portion of each of the holding members 222, and hardly comes off the through hole 223, so that the adsorbent 21 can be effectively prevented from being discharged from each end portion of the column 2.

3. Specific Configuration of Analysis Unit

Figure 3:
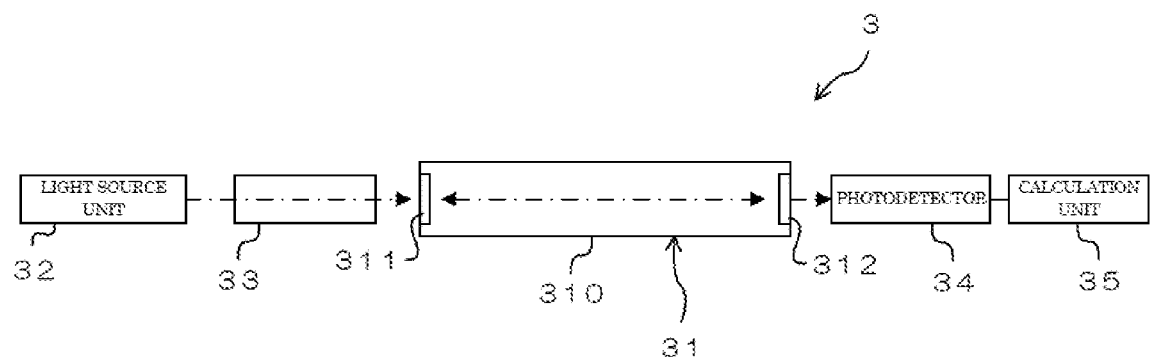
FIG. 3 is a schematic diagram for explaining a specific configuration of an analysis unit.

FIG. 3 is a schematic diagram for explaining a specific configuration of the analysis unit 3. In the analysis unit 3, the concentration of a target component in sample gas is calculated by cavity ring-down absorption spectroscopy (CRDS). The analysis unit 3 includes a light source unit 32, an optical switch 33, a photodetector 34, a calculation unit 35, and the like in addition to the cell 31 described above.

The light source unit 32 includes, for example, a laser light source, and emits laser light toward the cell 31. Light emitted from the light source unit 32 passes through the optical switch 33 and is applied to sample gas in the cell 31. The optical switch 33 can be switched to either a state in which light from the light source unit 32 is allowed to pass (passing state) or a state in which light from the light source unit 32 is cut off (cutoff state).

The cell 31 includes a housing 310 made from a hollow long member and a pair of mirrors 311 and 312 provided in both end portions in a longitudinal direction of the housing 310. A pair of the mirrors 311 and 312 are arranged such that their reflection surfaces face each other. These mirrors 311 and 312 are high-reflectivity mirrors and are arranged in the housing 310 to form a cavity. The cell 31 and the mirrors 311 and 312 constitute an optical resonator. An oscillation frequency of laser light in the light source unit 32 is adjusted to be a specific frequency (mode frequency) at which laser light can resonate. By the above, power of light can be accumulated in the cell 31. However, the number of the mirrors 311 and 312 is not limited to two, and three or more mirrors may be provided.

At the time of analysis, after sample gas is introduced into the cell 31, the optical switch 33 is brought into the passing state, and laser light adjusted so that an oscillation frequency becomes the mode frequency is emitted from the light source unit 32. Then, after power of the light is sufficiently accumulated in the cell 31, the optical switch 33 is switched to the cutoff state. As a result, the light accumulated in the cell 31 is repeatedly reflected between a pair of the mirrors 311 and 312, and sample gas in the cell 31 is repeatedly irradiated with the light. At this time, the light is repeatedly absorbed by a target component in the sample gas, and the light is gradually attenuated.

When light is repeatedly reflected between a pair of the mirrors 311 and 312, a part of the light passes through the mirror 312 which is one of them and is emitted to the outside, and the light is detected by the photodetector 34. The light passing through the mirror 312 which is one of them is repeatedly detected by the photodetector 34, so that a time constant (ring-down time) of attenuation of light can be calculated based on a result of the detection. Then, an absorption coefficient of a target component in the sample gas at a frequency of the emitted light is calculated based on the calculated ring-down time, and an absolute concentration of the target component is calculated based on the absorption coefficient. Further, if analysis is performed while scanning of an oscillation frequency of laser light in the light source unit 32 is performed, an absorption spectrum of the target component in the sample gas can be obtained.

An absorption coefficient α of a target component in sample gas can be obtained using, for example, Equation (1) below. In Equation (1) below, c is the speed of light. The symbol τ is ring-down time when sample gas is introduced into the cell 31. The symbol $\tau_0$ is ring-down time when sample gas is not introduced into the cell 31 (for example, in a vacuum state) or when there is no absorption by a component in sample gas.

$$\alpha = 1/c\{(1/\tau)-(1/\tau_0)\} \quad (1)$$

Further, a relationship between the absorption coefficient $\alpha$, number density n, and an absorption cross section $\sigma$ of a target component is expressed by Equation (2) below.

$$\alpha = n\sigma \quad (2)$$

Therefore, by using Equations (1) and (2) above, it is possible to calculate the absolute concentration of a component whose absorption cross section is known from the ring-down time $\tau$ and $\tau_0$. In a case where the concentration of a target component in sample gas is calculated using CRDS, light is repeatedly reflected between a pair of the mirrors 311 and 312, and absorption by the target component in the sample gas is promoted, so that a difference between the ring-down time $\tau$ and $\tau_0$ increases. By the above, it is possible to detect light absorption by a minute target component, and thus, it is possible to realize high detection sensitivity as compared with laser absorption spectroscopy of other types.

In particular, in a case where CRDS is used, it is possible to measure an isotopic ratio of $CO_2$, $H_2O$, or the like in sample gas with high accuracy. For example, among three isotopes $^{12}CO_2$, $^{13}CO_2$, and $^{14}CO_2$ contained in $CO_2$, $^{13}CO_2$ and $^{14}CO_2$ have lower concentrations than $^{12}CO_2$, but by using CRDS, concentrations of $^{13}CO_2$ and $^{14}CO_2$ can be calculated and an isotopic ratio can be measured with high accuracy.

The calculation unit 35 includes, for example, a processor including a CPU. The calculation unit 35 can calculate the concentration of a target component in sample gas based on a detection signal from the photodetector 34. At this time, the calculation unit 35 can perform calculation using Equations (1) and (2) above. As described above, the analysis unit 3 can analyze sample gas based on a change in intensity of light emitted by the light source unit 32. The calculation unit 35 can calculate, for example, a concentration of at least one of $^{13}CO_2$ and $^{14}CO_2$ in $CO_2$. However, the calculation unit 35 may calculate the concentration of a target component in sample gas using a calculation formula different from Equations (1) and (2).

4. Specific Example of Flow Path Switching

Figure 4A:
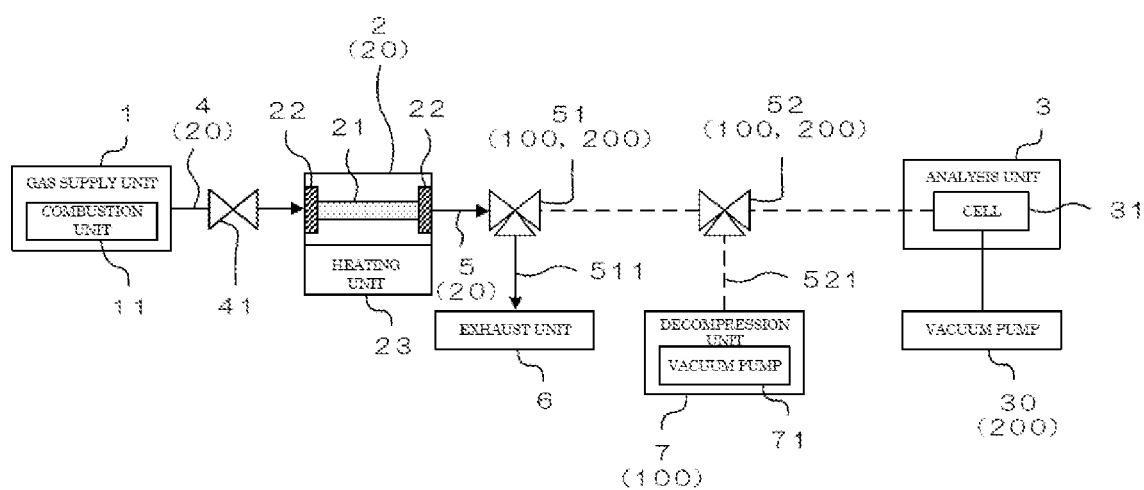
FIG. 4A is a flow path diagram for explaining a specific example of flow path switching by a first flow path switching unit and a second flow path switching unit, and illustrates a state in which the column communicates with an exhaust unit.
Figure 4B:
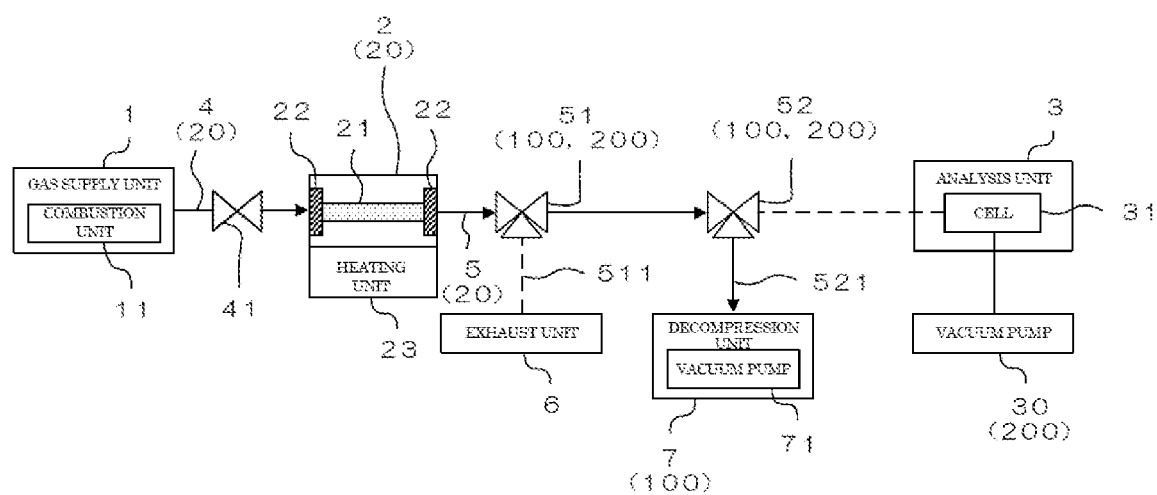
FIG. 4B is a flow path diagram for explaining a specific example of flow path switching by the first flow path switching unit and the second flow path switching unit, and illustrates a state in which the column communicates with a decompression unit.
Figure 4C:
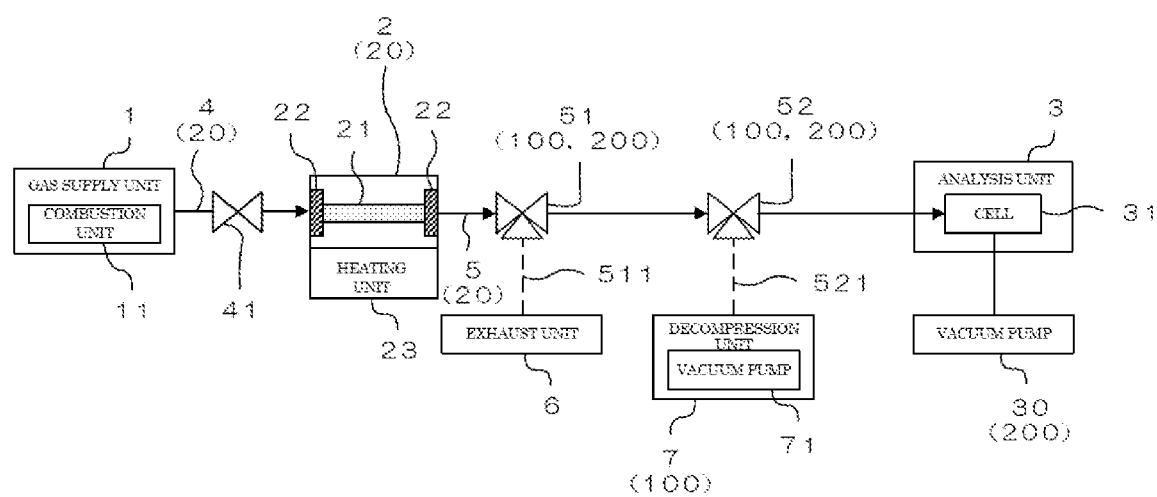
FIG. 4C is a flow path diagram for explaining a specific example of flow path switching by the first flow path switching unit and the second flow path switching unit, and illustrates a state in which the column communicates with a cell.

FIGS. 4A to 4C are flow path diagrams for explaining a specific example of flow path switching by the first flow path switching unit 51 and the second flow path switching unit 52. FIG. 4A illustrates a state in which the column 2 communicates with the exhaust unit 6. FIG. 4B illustrates a state in which the column 2 communicates with the decompression unit 7. FIG. 4C illustrates a state in which the column 2 communicates with the cell 31.

When the concentration of a target component in sample gas is measured, first, as illustrated in FIG. 4A, the first flow path switching unit 51 is in the branched state, so that the column 2 is in a state of communicating with the exhaust unit 6. Then, the valve 41 is set to an open state, and carrier gas is supplied from the gas supply unit 1 into the column 2 together with the sample gas (gas supply step). At this time, the column 2 is not heated by the heating unit 23. By the above, the sample gas introduced into the column 2 is adsorbed to the adsorbent 21.

The sample gas is introduced into the column 2 for predetermined introduction time, and then the valve 41 is switched to a closed state. Since the carrier gas is introduced into the column 2 together with the sample gas, the sample gas and the carrier gas are mixed in the column 2. Then, as illustrated in FIG. 4B, the first flow path switching unit 51 is in the non-branched state, and the second flow path switching unit 52 is in the branched state. By the above, the column 2 becomes in a state of communicating with the decompression unit 7.

When the vacuum pump 71 is driven in the state shown in FIG. 4B, gas in the lead-out path 5 is forcibly exhausted (sucked), so that the lead-out path 5 is decompressed to have negative pressure with respect to the inside of the column 2. At this time, since the sample gas is adsorbed to the adsorbent 21, the carrier gas is separated from the sample gas while the sample gas remains in the column 2, and the separated carrier gas is guided to the outside of the column 2 (gas separation step). The decompression unit 7, the first flow path switching unit 51, the second flow path switching unit 52, and the like constitute a gas separation mechanism 100 for guiding the carrier gas in the column 2 to the outside of the column 2. In the column 2, for example, carrier gas having a molecular weight of 32 or less and sample gas having a molecular weight of 33 or more may be separable by the action of the adsorbent 21.

The separation of carrier gas from the inside of the column 2 is performed for predetermined separation time, and after that, the second flow path switching unit 52 is switched to the non-branched state. By the above, as illustrated in FIG. 4C, the column 2 becomes in a state of communicating with the cell 31 via the lead-out path 5. At this time, the vacuum pump 30 is driven in advance, so that the cell 31 has negative pressure with respect to the column 2. In this state, when heating of the column 2 by the heating unit 23 is started, the sample gas adsorbed to the adsorbent 21 is desorbed (heating step), and the sample gas desorbed from the adsorbent 21 is introduced into the cell 31 (cell introduction step). The vacuum pump 30, the first flow path switching unit 51, the second flow path switching unit 52, and the like constitute a cell introduction mechanism 200 that introduces the sample gas desorbed from the adsorbent 21 into the cell 31 by setting the inside of the cell 31 to negative pressure.

After the above, as described with reference to FIG. 3, the sample gas introduced into the cell 31 is irradiated with light from the light source unit 32 (light irradiation step). Then, light passing through the cell 31 is detected by the photodetector 34 (detection step), and the concentration of a target component in the sample gas is calculated by the calculation unit 35 based on a detection signal from the photodetector 34 (calculation step). For example, in a case where the sample gas contains $CO_2$, at least one of $^{13}CO_2$ and $^{14}CO_2$ in $CO_2$ may be set as the target component, and the concentration of the target component may be calculated by the calculation unit 35. The light irradiation step and the calculation step constitute an analysis step of analyzing the sample gas on the basis of a change in intensity of light emitted by the light source unit 32.

5. Another Embodiment of Gas Absorption Spectroscopic Device

Figure 5:
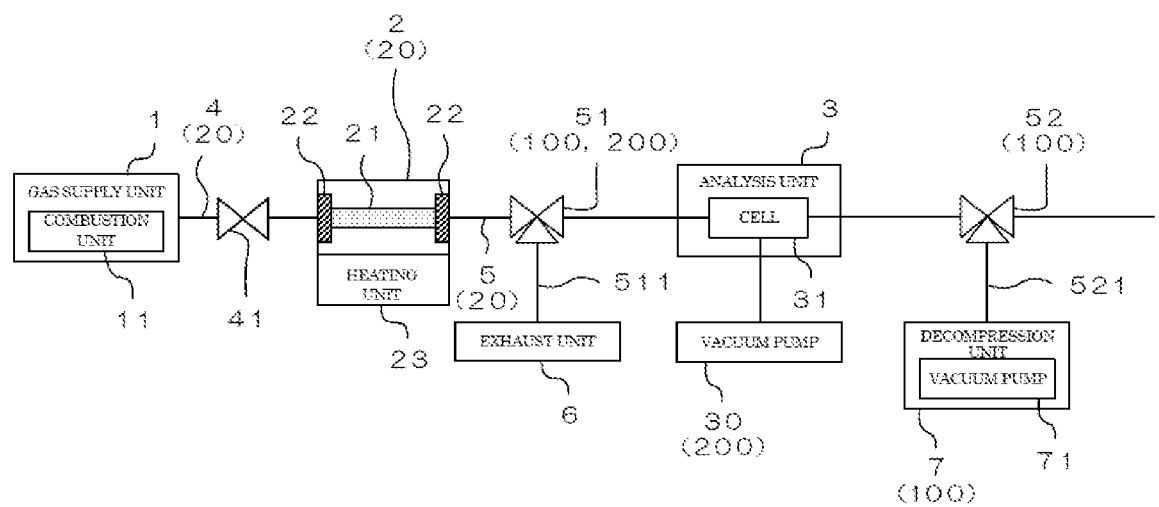
FIG. 5 is a flow path diagram illustrating another embodiment of the gas absorption spectroscopic device.

FIG. 5 is a flow path diagram illustrating another embodiment of the gas absorption spectroscopic device. The present embodiment is different from the above embodiment in the positions where the decompression unit 7, the second flow path switching unit 52, and the second branch path 521 are provided, but the other configurations are the same as those of the above embodiment. For this reason, the same configurations as those in the above embodiment are denoted by the same reference numerals in the diagram, and detailed description of the configurations will be omitted.

In the gas absorption spectroscopic device of FIG. 5, the second flow path switching unit 52 is provided further on the downstream side than the cell 31. That is, the cell 31 is interposed between the first flow path switching unit 51 and the second flow path switching unit 52 in the lead-out path 5, and gas having passed through the cell 31 flows to the second flow path switching unit 52.

When the first flow path switching unit 51 is in the branched state, the exhaust unit 6 communicates with the inside of the column 2 via the first branch path 511. On the other hand, when the first flow path switching unit 51 is in the non-branched state, the column 2 does not communicate with the exhaust unit 6 but communicates with the cell 31 and the second flow path switching unit 52.

When the second flow path switching unit 52 is in the branched state, the decompression unit 7 communicates with the first flow path switching unit 51 via the second branch path 521 and the cell 31. On the other hand, when the second flow path switching unit 52 is in the non-branched state, the cell 31 and the first flow path switching unit 51 do not communicate with the decompression unit 7, but communicate with the downstream side (for example, drain) of the lead-out path 5.

That is, in a case where the first flow path switching unit 51 is in the non-branched state and the second flow path switching unit 52 is in the branched state, the column 2 communicates with the decompression unit 7 via the first flow path switching unit 51, the cell 31, and the second flow path switching unit 52. On the other hand, in a case where the first flow path switching unit 51 is in the non-branched state and the second flow path switching unit 52 is also in the non-branched state, the column 2 does not communicate with either the exhaust unit 6 or the decompression unit 7.

6. Flow Path Switching in Another Embodiment

Figure 6A:
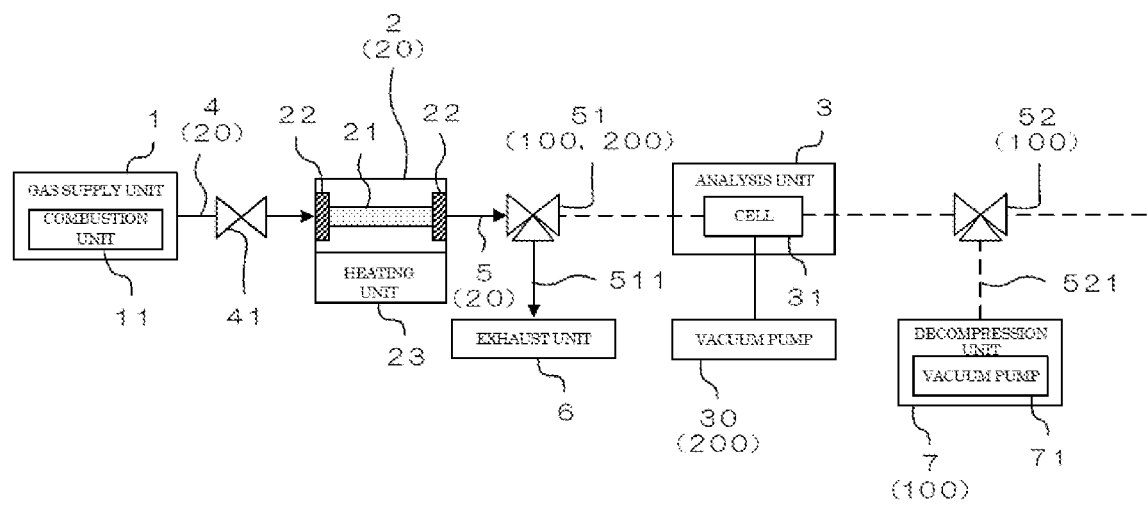
FIG. 6A is a flow path diagram for explaining a specific example of flow path switching by the first flow path switching unit and the second flow path switching unit in another embodiment, and illustrates a state in which the column communicates with the exhaust unit.
Figure 6B:
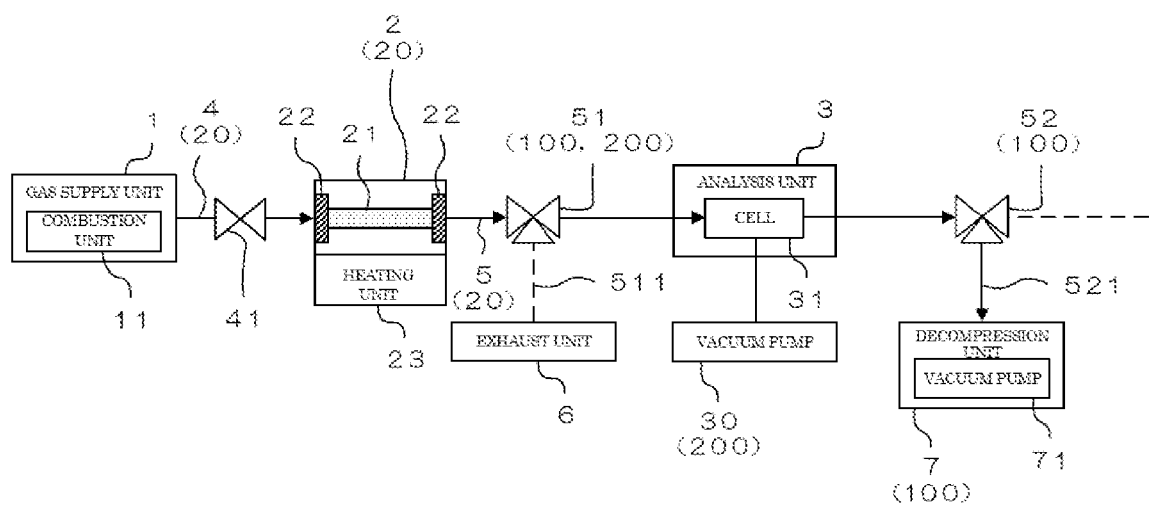
FIG. 6B is a flow path diagram for explaining a specific example of flow path switching by the first flow path switching unit and the second flow path switching unit in another embodiment, and illustrates a state in which the column communicates with the decompression unit.
Figure 6C:
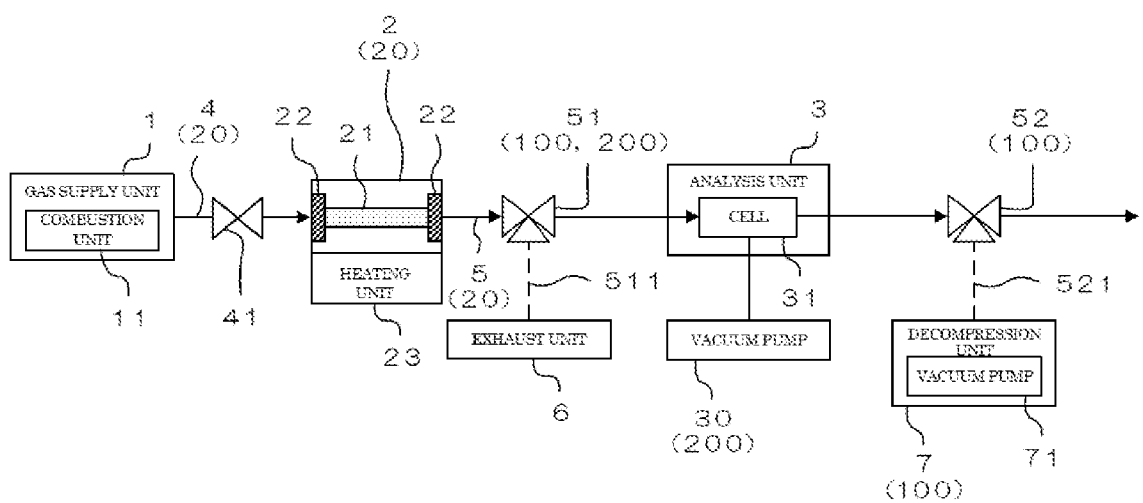
FIG. 6C is a flow path diagram for explaining a specific example of flow path switching by the first flow path switching unit and the second flow path switching unit in another embodiment, and illustrates a state in which the column does not communicate with either the exhaust unit or the decompression unit.

FIGS. 6A to 6C are flow path diagrams for explaining a specific example of flow path switching by the first flow path switching unit 51 and the second flow path switching unit 52 in another embodiment. FIG. 6A illustrates a state in which the column 2 communicates with the exhaust unit 6. FIG. 6B illustrates a state in which the column 2 communicates with the decompression unit 7. FIG. 6C illustrates a state in which the column 2 does not communicate with either the exhaust unit 6 or the decompression unit 7.

When the concentration of a target component in sample gas is measured, first, as illustrated in FIG. 6A, the first flow path switching unit 51 is in the branched state, so that the column 2 is in a state of communicating with the exhaust unit 6. Then, the valve 41 is set to an open state, and carrier gas is supplied from the gas supply unit 1 into the column 2 together with the sample gas (gas supply step). At this time, the column 2 is not heated by the heating unit 23. By the above, the sample gas introduced into the column 2 is adsorbed to the adsorbent 21.

The sample gas is introduced into the column 2 for predetermined introduction time, and then the valve 41 is switched to a closed state. Since the carrier gas is introduced into the column 2 together with the sample gas, the sample gas and the carrier gas are mixed in the column 2. Then, as illustrated in FIG. 6B, the first flow path switching unit 51 is in the non-branched state, and the second flow path switching unit 52 is in the branched state. By the above, the column 2 becomes in a state of communicating with the decompression unit 7 via the cell 31.

When the vacuum pump 71 is driven in the state shown in FIG. 6B, gas in the lead-out path 5 is forcibly exhausted (sucked), so that the lead-out path 5 is decompressed to have negative pressure with respect to the column 2. At this time, since the sample gas is adsorbed to the adsorbent 21, the carrier gas is separated from the sample gas while the sample gas remains in the column 2, and the separated carrier gas is guided to the outside of the column 2 (gas separation step). The decompression unit 7, the first flow path switching unit 51, the second flow path switching unit 52, and the like constitute the gas separation mechanism 100 for guiding the carrier gas in the column 2 to the outside of the column 2.

The separation of carrier gas from the inside of the column 2 is performed for predetermined separation time, and after that, the second flow path switching unit 52 is switched to the non-branched state. By the above, as illustrated in FIG. 6C, the column 2 does not communicate with either the exhaust unit 6 or the decompression unit 7, and the column 2 communicates only with the cell 31. At this time, the vacuum pump 30 is driven in advance, so that the cell 31 has negative pressure with respect to the column 2. In this state, when heating of the column 2 by the heating unit 23 is started, the sample gas adsorbed to the adsorbent 21 is desorbed (heating step), and the sample gas desorbed from the adsorbent 21 is introduced into the cell 31 (cell introduction step). The vacuum pump 30, the first flow path switching unit 51, and the like constitute the cell introduction mechanism 200 that introduces the sample gas desorbed from the adsorbent 21 into the cell 31 by setting the inside of the cell 31 to negative pressure.

After the above, the sample gas introduced into the cell 31 is irradiated with light from the light source unit 32 (light irradiation step). Then, light passing through the cell 31 is detected by the photodetector 34 (detection step), and the concentration of a target component in the sample gas is calculated by the calculation unit 35 based on a detection signal from the photodetector 34 (calculation step). The light irradiation step and the calculation step constitute the analysis step of analyzing the sample gas on the basis of a change in intensity of light emitted by the light source unit 32.

When the vacuum pump 71 is driven in the state shown in FIG. 6B, gas in the lead-out path 5 is sucked by the decompression unit 7 via the cell 31. Therefore, the cell 31 is in a state of being filled with gas guided to the outside of the column 2. At this point, the light irradiation step, the detection step, and the calculation step may be started. That is, in each of the states of FIGS. 6B and 6C, the cell 31 is irradiated with light, and light passing through the cell 31 is detected by the photodetector 34, so that the concentration of a target component in gas may be calculated based on a signal of the detection. Even in the state of FIG. 6B, the sample gas may be contained in the gas guided to the outside of the column 2. Therefore, as analysis by the analysis unit 3 is started in the state of FIG. 6B, gas guided from the column 2 into the cell 31 can be analyzed during the gas separation step.

7. Variation of Another Embodiment

In the gas absorption spectroscopic device of the another embodiment illustrated in FIG. 5, it is also possible to omit heating of the column 2 by the heating unit 23. Depending on a type of sample gas, an analytical condition, or the like, sample gas adsorbed to the adsorbent 21 of the column 2 may be introduced into the cell 31 by negative pressure without heating of the column 2. Therefore, it is also possible to conduct analysis by guiding sample gas in the column 2 to the cell 31 by using negative pressure.

In this case, first, as illustrated in FIG. 6A the first flow path switching unit 51 is in the branched state, so that the column 2 is in a state of communicating with the exhaust unit 6. Then, the valve 41 is set to an open state, and carrier gas is supplied from the gas supply unit 1 into the column 2 together with the sample gas (gas supply step). By the above, the sample gas introduced into the column 2 is adsorbed to the adsorbent 21.

The sample gas is introduced into the column 2 for predetermined introduction time, and then the valve 41 is switched to a closed state. Since the carrier gas is introduced into the column 2 together with the sample gas, the sample gas and the carrier gas are mixed in the column 2. Then, as illustrated in FIG. 6B, the first flow path switching unit 51 is in the non-branched state, and the second flow path switching unit 52 is in the branched state. By the above, the column 2 becomes in a state of communicating with the decompression unit 7 via the cell 31.

When the vacuum pump 71 is driven in the state shown in FIG. 6B, gas in the lead-out path 5 is forcibly exhausted (sucked), so that the lead-out path 5 is decompressed to have negative pressure with respect to the column 2. At this time, gas in the column 2 is introduced into the cell 31 (cell introduction step). The gas introduced into the column 2 includes the sample gas adsorbed to the adsorbent. However, the carrier gas and the sample gas in the column 2 may be sequentially guided into the cell 31.

After the above, the sample gas introduced into the cell 31 is irradiated with light from the light source unit 32 (light irradiation step). Then, light passing through the cell 31 is detected by the photodetector 34 (detection step), and the concentration of a target component in the sample gas is calculated by the calculation unit 35 based on a detection signal from the photodetector 34 (calculation step). The light irradiation step and the calculation step constitute the analysis step of analyzing the sample gas on the basis of a change in intensity of light emitted by the light source unit 32.

8. Other Variations

In the above embodiment, the case where sample gas contains $CO_2$ and at least one of $^{13}CO_2$ and $^{14}CO_2$ in $CO_2$ is used as a target component is described. However, the present invention is not limited to such a configuration, and sample gas may contain a component other than $CO_2$. In this case, the gas supply unit 1 is not limited to the configuration including the combustion unit 11. For example, sample gas may contain a volatile organic compound.

Switching of each valve and driving of the vacuum pumps 30 and 71 may be automatically controlled by a control unit (not illustrated) configured by a processor including, for example, a CPU, or may be manually performed by the user. The control by the control unit is performed based on, for example, pressure of gas flowing through the lead-out path 5, temperature of the column 2, or the like. The pressure of gas flowing through the lead-out path 5 can be detected, for example, by providing a pressure gauge in the lead-out path 5. Further, the temperature of the column 2 can be detected, for example, by providing a thermometer in close contact with or close to the column 2. Further, the gas capturing unit 20 is not limited to one that causes the adsorbent 21 to adsorb sample gas, and may be one that captures sample gas in another mode.

In the above embodiment, the configuration in which the first flow path switching unit 51, the second flow path switching unit 52, and the like are provided in the lead-out path 5 is described. However, the present invention is not limited to such a configuration, and the flow path configuration of the gas absorption spectroscopic device is optional. For example, the first flow path switching unit 51 and the second flow path switching unit 52 may be configured by one member, or may be configured by using another valve or the like. Further, the present invention is not limited to the configuration in which the concentration of a target component in sample gas is calculated using CRDS, and the concentration of a target component may be calculated by another method.

The present invention can be applied not only to a gas absorption spectroscopic device but also to other gas spectroscopic devices. For example, the present invention is also applicable to a device (fluorescence device) that irradiates a cell into which sample gas is introduced with excitation light to detect fluorescence emitted by a target component in the sample gas with a photodetector. In this case, the light source unit may emit light having a wavelength other than laser light, such as an LED light source, instead of a laser light source.

9. Aspect

It is understood by those skilled in the art that a plurality of the exemplary embodiments described above are specific examples of an aspect below.

(Clause 1) A gas spectroscopic device according to an aspect may include: a gas capturing unit that includes a column, an upstream side flow path, and a downstream side flow path and that captures sample gas; a gas supply unit that is connected to the upstream side flow path of the gas capturing unit and supplies carrier gas for sending sample gas into the column; a gas separation mechanism that guides carrier gas in the column to the outside of the column by setting the downstream side flow path of the gas capturing unit to negative pressure with respect to the inside of the column; a heating unit that heats the column to desorb sample gas captured by the gas capturing unit; a cell that receives sample gas desorbed from the gas capturing unit; a light source unit that irradiates sample gas in the cell with light; and an analysis unit that analyzes the sample gas based on an intensity change of light emitted by the light source unit.

According to the gas spectroscopic device described in Clause 1, since carrier gas in the column is guided to the outside of the column by negative pressure, sample gas is captured in the gas capturing unit at a high concentration. Therefore, by desorbing sample gas from the gas capturing unit and introducing the sample gas into the cell, the concentration of the sample gas in the cell can be increased.

(Clause 2) In the gas spectroscopic device according to Clause 1, the sample gas may contain $CO_2$.

According to the gas spectroscopic device described in Clause 2, $CO_2$ contained in the sample gas is captured in the gas capturing unit at a high concentration, and the $CO_2$ is desorbed from the gas capturing unit and introduced into the cell, so that the concentration of $CO_2$ in the cell can be increased.

(Clause 3) In the gas spectroscopic device according to Clause 2, the analysis unit may further include a photodetector that detects light emitted from the inside of the cell to the outside, and a calculation unit that calculates the concentration of at least one of $^{13}CO_2$ and $^{14}CO_2$ in the $CO_2$ based on a detection signal from the photodetector.

According to the gas spectroscopic device described in Clause 3, the concentration of at least one of isotopes $^{13}CO_2$ and $^{14}CO_2$ contained in $CO_2$ can be calculated with high accuracy.

(Clause 4) In the gas spectroscopic device according to Clause 1, the cell may include a housing and a high-reflectivity mirror that is arranged in the housing and constitutes a cavity, and the analysis unit may calculate the concentration of a target component in sample gas by cavity ring-down absorption spectroscopy.

According to the gas spectroscopic device described in Clause 4, it is possible to detect light absorption by a trace amount of a target component, and thus, it is possible to realize high detection sensitivity.

(Clause 5) In the gas spectroscopic device according to Clause 1, the sample gas may contain a volatile organic compound.

According to the gas spectroscopic device described in Clause 5, a volatile organic compound contained in the sample gas is captured in the gas capturing unit at a high concentration, and the volatile organic compound is desorbed from the gas capturing unit and introduced into the cell, so that the concentration of a volatile organic compound in the cell can be increased.

(Clause 6) In the gas spectroscopic device according to Clause 1, the gas separation mechanism may include a decompression unit that reduces pressure in the downstream side flow path.

According to the gas spectroscopic device described in Clause 6, the downstream side flow path is reduced in pressure by the decompression unit to have negative pressure with respect to the inside of the column, and carrier gas in the column can be guided to the outside of the column.

(Clause 7) In the gas spectroscopic device according to Clause 6, the decompression unit may suck gas in the downstream side flow path via the cell.

According to the gas spectroscopic device described in Clause 7, gas guided to the outside of the column when the downstream side flow path is reduced in pressure is introduced from the column into the cell. For example, when the downstream side flow path is reduced in pressure, in a case where sample gas is contained in gas guided to the outside of the column, the gas can be guided into the cell, and the gas in the cell can be irradiated with light from the light source unit.

(Clause 8) In the gas spectroscopic device according to Clause 1, may further include a cell introduction mechanism that introduces sample gas desorbed from the gas capturing unit into the cell by setting the inside of the cell to negative pressure.

According to the gas spectroscopic device described in Clause 8, by setting the inside of the cell to negative pressure, sample gas can be introduced into the cell from the gas capturing unit without using carrier gas.

(Clause 9) A gas spectroscopic method according to one aspect may include: a gas supply step of supplying carrier gas for sending sample gas from a gas supply unit connected to an upstream side flow path provided in a gas capturing unit for capturing sample gas into a column provided in the gas capturing unit; a gas separation step of guiding carrier gas in the column to the outside of the column by setting a downstream side flow path provided in the gas capturing unit to negative pressure with respect to the inside of the column; a heating step of heating the column to desorb sample gas captured by the gas capturing unit; a cell introduction step of introducing sample gas desorbed from the gas capturing unit into a cell; a light irradiation step of irradiating sample gas in the cell with light from a light source unit; and an analysis step of analyzing the sample gas based on an intensity change of light emitted by the light source unit.

According to the gas spectroscopic method described in Clause 9, since carrier gas in the column is guided to the outside of the column by negative pressure, sample gas is captured in the gas capturing unit at a high concentration. Therefore, by desorbing sample gas from the gas capturing unit and introducing the sample gas into the cell, the concentration of the sample gas in the cell can be increased.

(Clause 10) In the gas spectroscopic method according to Clause 9, the sample gas may contain $CO_2$.

According to the gas spectroscopic method described in Clause 10, $CO_2$ contained in the sample gas is captured in the gas capturing unit at a high concentration, and the $CO_2$ is desorbed from the gas capturing unit and introduced into the cell, so that the concentration of $CO_2$ in the cell can be increased.

(Clause 11) In the gas spectroscopic method according to Clause 10, the analysis step may further include a detection step of detecting light emitted from inside of the cell to outside with a photodetector, and a calculation step of calculating a concentration of at least one of $^{13}CO_2$ and $^{14}CO_2$ in the $CO_2$ based on a detection signal from the photodetector.

According to the gas spectroscopic method described in Clause 11, the concentration of at least one of isotopes $^{13}CO_2$ and $^{14}CO_2$ contained in $CO_2$ can be calculated with high accuracy.

(Clause 12) In the gas spectroscopic method according to claim 11, the cell may include a housing and a high-reflectivity mirror that is arranged in the housing and constitutes a cavity, and the analysis step may calculate the concentration of a target component in sample gas by cavity ring-down absorption spectroscopy.

According to the gas spectroscopic method described in Clause 12, it is possible to detect light absorption by a trace amount of a target component, and thus, it is possible to realize high detection sensitivity.

(Clause 13) In the gas spectroscopic method according to Clause 9, the sample gas may contain a volatile organic compound.

According to the gas spectroscopic method described in Clause 13, a volatile organic compound contained in the sample gas is captured in the gas capturing unit at a high concentration, and the volatile organic compound is desorbed from the gas capturing unit and introduced into the cell, so that the concentration of a volatile organic compound in the cell can be increased.

(Clause 14) In the gas spectroscopic method according to Clause 9, the gas separation step may reduce pressure in the downstream side flow path with a decompression unit.

According to the gas spectroscopic method described in Clause 14, the downstream side flow path is reduced in pressure by the decompression unit to have negative pressure with respect to the inside of the column, and carrier gas in the column can be guided to the outside of the column.

(Clause 15) In the gas spectroscopic method according to Clause 14, the decompression unit may suck gas in the downstream side flow path via the cell.

According to the gas spectroscopic method described in Clause 15, gas guided to the outside of the column when the downstream side flow path is reduced in pressure is introduced from the column into the cell. For example, when the downstream side flow path is reduced in pressure, in a case where sample gas is contained in gas guided to the outside of the column, the gas can be guided into the cell, and the gas in the cell can be irradiated with light from the light source unit.

(Clause 16) In the gas spectroscopic method according to Clause 9, the cell introduction step may introduce sample gas desorbed from the gas capturing unit into the cell by setting the inside of the cell to negative pressure.

According to the gas spectroscopic method described in Clause 16, by setting the inside of the cell to negative pressure, sample gas can be introduced into the cell from the gas capturing unit without using carrier gas.

(Clause 17) A gas spectroscopic method according to another aspect may include: a gas supply step of supplying carrier gas for sending sample gas from a gas supply unit connected to an upstream side flow path provided in a gas capturing unit for capturing sample gas into a column provided in the gas capturing unit; a cell introduction step of introducing sample gas captured by the gas capturing unit into a cell by setting a downstream side flow path provided in the gas capturing unit to negative pressure with respect to the inside of the column; a light irradiation step of irradiating sample gas in the cell with light from a light source unit; and an analysis step of analyzing the sample gas based on an intensity change of light emitted by the light source unit.

According to the gas spectroscopic method described in Clause 17, since sample gas in the column is introduced into the cell by negative pressure, the sample gas can be introduced into the cell without heating the column.

DESCRIPTION OF REFERENCE SIGNS 1 gas supply unit
2 column
3 analysis unit
4 introduction path
5 lead-out path
6 exhaust unit
7 decompression unit
11 combustion unit
20 gas capturing unit
21 adsorbent
22 sealing portion
23 heating unit
30 vacuum pump
31 cell
32 light source unit
33 optical switch
34 photodetector
35 calculation unit
41 valve
51 first flow path switching unit
52 second flow path switching unit
71 vacuum pump
100 gas separation mechanism
200 cell introduction mechanism
221 filter member
222 holding member
223 through hole
224 tapered surface
310 housing
311 mirror
312 mirror
511 first branch path
521 second branch path

The invention claimed is:

1. A gas spectroscopic device comprising:
   a gas capturing device that includes a column, an upstream side flow path, and a downstream side flow path and that captures sample gas;
   a gas supply device that is connected to the upstream side flow path of the gas capturing device and supplies carrier gas for sending sample gas into the column;
   a valve that switches the upstream side flow path to either an open state or a closed state;
   a gas separation mechanism that guides carrier gas in the column to outside of the column by setting the downstream side flow path of the gas capturing device to negative pressure with respect to inside of the column in a state where the valve is the closed state;
   a heater that heats the column to desorb sample gas captured by the gas capturing device;
   a cell that receives sample gas desorbed from the gas capturing device;
   a light source that irradiates sample gas in the cell with light; and
   a processor that analyzes the sample gas based on an intensity change of light emitted by the light source,
   wherein the processor controls the valve to be switched to the closed state to block an introduction of carrier gas into the column and operates the gas separation mechanism while the valve is maintained in the closed state to suck the carrier gas from the column.

2. The gas spectroscopic device according to claim 1, wherein
   the sample gas contains $CO_2$.

3. The gas spectroscopic device according to claim 2, further comprising:
   a photodetector that detects light emitted from inside of the cell to outside, and
   the processor calculates a concentration of at least one of $13CO_2$ and $14CO_2$ in the $CO_2$ based on a detection signal from the photodetector.

4. The gas spectroscopic device according to claim 3, wherein
   the cell includes a housing and a high-reflectivity mirror that is arranged in the housing and constitutes a cavity, and
   the processor calculates a concentration of a target component in sample gas by cavity ring-down absorption spectroscopy.

5. The gas spectroscopic device according to claim 1, wherein the sample gas contains a volatile organic compound.

6. The gas spectroscopic device according to claim 1, wherein the gas separation mechanism includes a vacuum pump that reduces pressure in the downstream side flow path.

7. The gas spectroscopic device according to claim 6, wherein the vacuum pump sucks gas in the downstream side flow path via the cell.

8. The gas spectroscopic device according to claim 1, further comprising a pump that introduces the sample gas desorbed from the gas capturing device into the cell by setting inside of the cell to negative pressure.

9. A gas spectroscopic method comprising:
   a gas supply step of supplying carrier gas for sending sample gas from a gas supply device connected to an upstream side flow path provided in a gas capturing device for capturing sample gas into a column provided in the gas capturing device;
   a gas separation step of guiding carrier gas in the column to outside of the column by setting a downstream side flow path provided in the gas capturing device to negative pressure with respect to inside of the column in a state where the upstream side flow path is closed;

a heating step of heating the column to desorb sample gas captured by the gas capturing device;

a cell introduction step of introducing the sample gas desorbed from the gas capturing device into a cell;

a light irradiation step of irradiating sample gas in the cell with light from a light source; and an analysis step of analyzing the sample gas based on an intensity change of light emitted by the light source, wherein the gas separation step includes setting a valve to a closed state to block an introduction of carrier gas into the column and operating a gas separation mechanism while the valve is maintained in the closed state to suck the carrier gas from the column.

10. The gas spectroscopic method according to claim 9, wherein the sample gas contains CO2.

11. The gas spectroscopic method according to claim 10, wherein the analysis step further includes a detection step of detecting light emitted from inside of the cell to outside with a photodetector, and a calculation step of calculating a concentration of at least one of 13CO2 and 14CO2 in the CO2 based on a detection signal from the photodetector.

12. The gas spectroscopic method according to claim 11, wherein the cell includes a housing and a high-reflectivity mirror that is arranged in the housing and constitutes a cavity, and the analysis step calculates a concentration of a target component in sample gas by cavity ring-down absorption spectroscopy.

13. The gas spectroscopic method according to claim 9, wherein the sample gas contains a volatile organic compound.

14. The gas spectroscopic method according to claim 9, wherein the gas separation step reduces pressure in the downstream side flow path with a vacuum pump.

15. The gas spectroscopic method according to claim 14, wherein the vacuum pump sucks gas in the downstream side flow path via the cell.

16. The gas spectroscopic method according to claim 9, wherein the cell introduction step introduces sample gas desorbed from the gas capturing device into the cell by setting inside of the cell to negative pressure.

17. A gas spectroscopic method comprising:

a gas supply step of supplying carrier gas for sending sample gas from a gas supply device connected to an upstream side flow path provided in a gas capturing device for capturing sample gas into a column provided in the gas capturing device;

a cell introduction step of introducing sample gas captured by the gas capturing device into a cell by setting a downstream side flow path provided in the gas capturing device to negative pressure with respect to inside of the column in a state where the upstream side flow path is closed;

a light irradiation step of irradiating sample gas in the cell with light from a light source;

a gas separation step of setting a valve to a closed state to block an introduction of carrier gas into the column and operating a gas separation mechanism while the valve is maintained in the closed state to suck the carrier gas from the column; and an analysis step of analyzing the sample gas based on an intensity change of light emitted by the light source.

18. A gas spectroscopic device comprising:

a gas capturing device that includes a column, an upstream side flow path, and a downstream side flow path and that captures sample gas, the column including an adsorbent and a heater;

a gas supply device that is connected to the upstream side flow path of the gas capturing device and supplies carrier gas for sending sample gas into the column;

a valve that switches the upstream side flow path to either an open state or a closed state;

a flow path switch that switches between a first state that connects the downstream side flow path and a sample gas analyzer, and a second state that connects the downstream side flow path and a branch flow path; and a gas separation mechanism connected to the branch flow path and that exhausts carrier gas in the column to outside of the column along the branch flow path by setting the downstream side flow path and the branch flow path to negative pressure with respect to inside of the column in a state where the valve is the closed state, the flow path switch is in the second state, and the heater is in the off state, wherein the heater switches to an on state and heats the adsorbent to desorb sample gas captured by the adsorbent when the flow path switch is in the first state, and wherein the sample gas analyzer includes a cell that receives the sample gas desorbed from the gas capturing device, a light source that irradiates sample gas in the cell with light, and a processor that analyzes the sample gas based on an intensity change of light emitted by the light source.

19. A gas spectroscopic method comprising:

a gas supply step of supplying carrier gas for sending sample gas from a gas supply device connected to an upstream side flow path provided in a gas capturing device for capturing sample gas into a column, including an adsorbent and a heater, provided in the gas capturing device;

a gas separation step of guiding carrier gas in the column to outside of the column and along a branch flow path by setting a downstream side flow path provided in the gas capturing device to negative pressure with respect to inside of the column in a state where the upstream side flow path is closed and the heater is in an off state;

a heating step of switching the heater to an on state and heating the adsorbent to desorb sample gas captured by adsorbent;

a cell introduction step of introducing the sample gas desorbed from the gas capturing device into a sample gas analyzer that includes a cell;

a light irradiation step of irradiating sample gas in the cell with light from a light source; and an analysis step of analyzing the sample gas based on an intensity change of light emitted by the light source, wherein the carrier gas flowing along the branch flow path is not introduced into the sample gas analyzer.

* * * * *